March 22, 1966　　　A. H. SNELL, JR　　　3,241,806
DISC VALVE HAVING PLASTIC LAYER ON RESILIENT SEATING SURFACE
Filed April 2, 1963

ARTHUR H. SNELL, JR.
INVENTOR.

BY Browning, Simmons,
Heger & Eickensoht

3,241,806
DISC VALVE HAVING PLASTIC LAYER ON RESILIENT SEATING SURFACE

Arthur H. Snell, Jr., Houston, Tex., assignor to Keystone Valve Corporation, Houston, Tex., a corporation of Texas
Filed Apr. 2, 1963, Ser. No. 269,949
9 Claims. (Cl. 251—148)

This invention relates to improved disc valves and disc valve seats.

Disc valves, or "butterfly" valves as they are commonly called, have a circular disc rotatably mounted within an annular seat. The seat has an inside diameter less than the outside diameter of the disc and when the disc is rotated to a position closing the passage through the valve, it compresses the annular seat and produces an interference type seal with the seat. The seal thus obtained results from the resistance the seat offers to the compressive force of the disc, i.e., the resiliency of the material from which the seat is made. Since disc valve seats wear under the rotating action of the disc, they are usually replaced several times during the life of the valve body. Therefore, disc valve seats should be resilient to produce a good seal with the valve disc and flexible to allow them to be removed from and inserted undamaged into the valve body with a minimum of effort. Also, they should be wear resistant so that they will not need replacing too often.

One material commonly used for disc valve seats which is resilient, flexible and wear resistant is rubber. Both natural and synthetic rubbers are satisfactory. The synthetics are better in some respects than natural rubber and vice versa. Both synthetic and natural rubber, however, cannot be exposed to certain fluids such as oils with low aniline points, strong acids or bases, etc. Attempts have been made to use valve seats made of other materials for handling these fluids which are deleterious to rubber but this was unsatisfactory. Teflon (fluorinated ethylenepropylene copolymer), for example, is unaffected by oils with low aniline points. When tried as a disc valve seat material, due to its rigidity it could not be mounted in an integral body type of valve and, in a split body type of valve, it was found to cold flow under the compressive force of the valve element and take a permanent set. Since, as explained above, disc valves rely on the compressive force placed on the valve seat by the valve element to obtain an interference type seal, a material which takes a permanent set when compressed will soon have an enlarged inside diameter and thereafter, the pressure that the valve will hold is greatly reduced.

It is an object of this invention to provide a disc valve having a seat which is highly resistant to corrosive fluids and which also has the required resiliency to maintain a proper seal between the seat and the valve element.

Another object of this invention is to provide a valve seat for a disc valve which can resist corrosive fluids and yet is suffiicently flexible to be easily inserted and removed from the valve body even where considerable distortion of the seat is required to install it in a valve body.

Other objects, features and advantages of the invention will appear from time to time or will be apparent to one skilled in the art upon consideration of the specification, claims and attached drawings.

In its preferred form, the invention comprises a disc valve having a valve seat which includes a relatively thick body made of rubber-like resilient material and a relatively thin coating of plastic which covers the inner surface of the body and portions of its ends. The plastic is held in sealing engagement with the valve body by the resiliency of the rubber-like material and completely isolates the rubber-like material from fluids in the valve. Preferably, the relative thicknesses of the two materials are such that the rubber-like material provides substantially all of the necessary flexibility and resiliency required of a disc valve seat, whereas the plastic material provides a satisfactory sealing surface which will not be worn away by the rotating valve element.

In the drawings where there is shown, by way of illustration, one embodiment of the invention:

Figure 1:
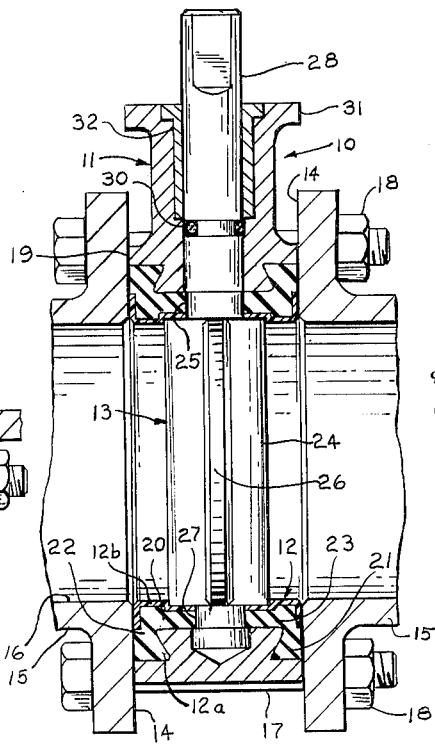
FIG. 1 is a longitudinal sectional view of a disc type valve with the disc in position closing the flowway through the seat.

The disc valve in the drawings, generally indicated by the number 10, comprises a one-piece tubular body 11, a tubular seat of resilient material generally indicated by the number 12, and a valve member 13 for opening and closing the flowway through the seat. In its operative position, valve 10 is disposed between end faces 14 of tubular flange members 15 which may be connected at their outer ends in a conduit (not shown) or which may form the inner ends of the conduit itself. As can be seen in FIG. 1, the flowway through seat 12 forms a continuation of flowway 16 through flange members 15.

Figure 2:
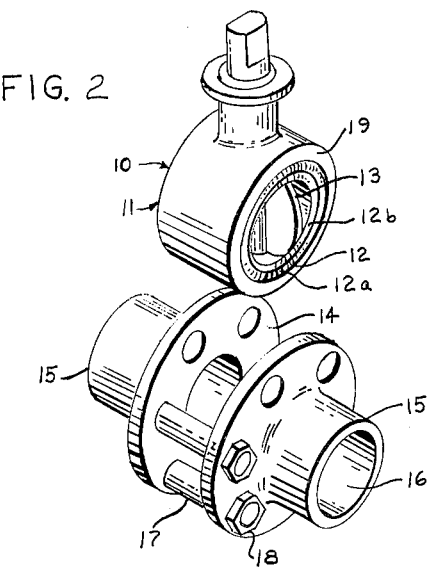
FIG. 2 is a prospective view of the body, seat and disc of FIG. 1 moved from the space between the end faces of the flanges in the conduit between which the valve is installed, the disc being shown in its open position.

The radially extending flanges of members 15 are connected to each other by means of bolts 17 within which the valve is supported. As shown in FIG. 2, certain of the bolts might be removed to permit the valve to be moved into and out of its assembled position. Nuts 18 on the ends of the bolts enable end faces 14 to be moved axially toward and away from one another so as to facilitate removal and insertion of the valve. Valve body 11 is provided with flat annular faces 19 on its opposite sides which engage the flat end faces of the flange members and which lie in a plane substantially transverse of the flowway. A dovetailed ring 20 on an intermediate portion of the inner periphery of the body forms annular undercut recesses 21 on the sides of the body located opposite end faces 14 of the flange members.

Valve seat 12 comprises a relatively thick body 12a of resilient rubber-like material which has its inner surface and portions of each end covered by a relatively thin layer 12b of plastic material. The body 12a is shaped to fit around the dovetailed ring 20. It has a web section 23 which extends across the inner surface of the ring and annular rims 22 on each end of the web which extend radially outwardly into recesses 21 between faces 14 of the flange members and the ring. The relatively thin layer 12b of plastic material extends across the inner surface of the body of rubber-like material and upward along each side of the rims a sufficient distance to be engaged by end faces 14 of the flange members when the valve is assembled between them. The plastic could extend upward completely along the outer edge of the rims, if desired. Preferably, however, it only comes far enough up the rims to form a seal with the end faces of the flanges, leaving a portion of the rims exposed to also form a seal with the end faces of the flanges. This provides an additional seal to back up the plastic-to-metal seal and prevent the valve from leaking should the plastic-to-metal seal fail for any reason.

The valve seat is not bonded or otherwise secured to the body, allowing it to be removed easily therefrom for replacement. This emphasizes the need for flexibility in the valve seat since, in the embodiment shown, it must be able to be distorted sufficiently to be inserted into the one-piece annular valve body and positioned around the dovetailed ring without being damaged. For this reason, the body 12a is usually made of rubber, either natural or synthetic, as rubber is both resilient and highly flexible. The plastic layer 12b is preferably relatively thin so that the distortion of the seat required to locate it properly in the valve body will not be detrimental to this layer. Further, by keeping the plastic layer relatively thin, any inherent stiffness it may have will not be sufficient to prevent the valve seat from having the desired flexibility.

Valve member 13 comprises a disc having a central tubular portion 24 mounted upon stem 25 for rotation between the position opening the flowway, as shown in FIG. 2, and a position closing same, as shown in FIG. 1. The outer edge 26 of the disc has a greater diameter than the inside diameter of the valve seat, causing the valve seat to exert sufficient force against the valve element to maintain a seal between the two. For this reason, the valve seat should be sufficiently resilient to be alternately compressed and released without becoming permanently deformed. As pointed out above, if the valve seat takes a permanent set when compressed by the disc, the compressive force between the two will be reduced and so will the pressure against which the seal can be maintained.

As shown in FIG. 1, stem 25 includes a lower end 27 journaled in the lower portion of the tubular body and an upper end 28, journalled in the upper portion of the body, and extending exteriorly of the body for manipulation by a suitable tool in rotating the disc between its open and closed positions. The stem end portions are removably received through holes in the valve seat to permit separation of stem and disc for replacing the seat. These holes, both in body 12a and plastic layer 12b, are smaller in diameter than the stem end portions to provide a seal between the stem and seat. Another seal is obtained between the stem and the seat by making tubular portion 24 of the valve member sufficiently long to compress the valve seat at all times and maintain a seal between the tubular portion and plastic layer 12b. Thus, two seals are provided to prevent fluid from escaping from the valve between the seat and the valve stem.

To prevent dust, etc., from entering the valve, an O-ring 30 surrounds stem portion 28 to form a seal with the upper portion of the body. A bushing 32 is received within a counterbore of neck 31 of the body to surround stem end portion 28 above seal ring 30 and provide a bearing for the upper portion of the stem.

Figure 3:
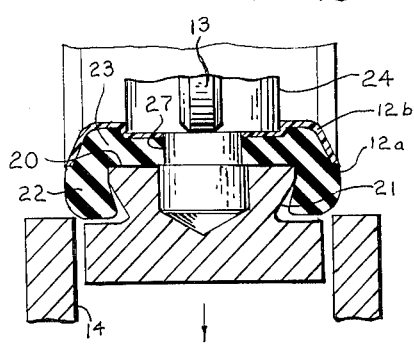
FIG. 3 is a fragmentary cross-sectional view of the lower end of the body, seat and disc as they are moved into the space between the end faces to illustrate the cross-sectional shape of the valve seat in its relaxed condition and also to illustrate the area encompassed by the plastic layer in the preferred embodiment of the invention.

As shown in FIG. 3, rims 22 on the seat are sufficiently large to substantially fill the undercut recesses 21 formed on the inner peripheral edges of the body. This locks the valve seat in place so that it can be used under vacuum conditions. It also provides sufficient compression in the rims to maintain a seal between them and faces 14 of the flange members.

Web section 23 of body 12a is sufficiently longer than body 10 to obtain enough compression in the web to hold the portion of the plastic layer which covers the ends of the seat in sealing engagement with the end faces of the flange members to completely isolate body 12a of the seat from the fluids carried by the valve.

Figure 4:
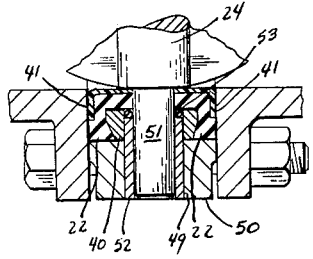
FIG. 4 is a fragmentary cross-sectional view of the lower end of the body, seat and disc of another embodiment of the invention.
Figure 5:
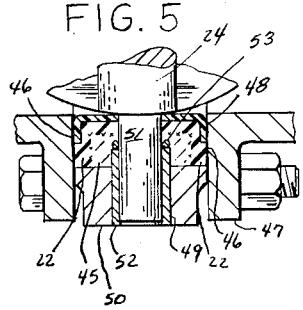
FIG. 5 is a view similar to FIG. 4 showing yet another embodiment of the invention.

It is not necessary that ring 20 be integrally attached to the body or that it be dovetailed as shown. FIGS. 4 and 5 illustrate alternate embodiments of the invention wherein the ring is separate from the valve body which greatly simplifies insertion and removal of the valve seat. In FIG. 4, the ring is shown as a separate ring 40 of rigid material positioned between rims 22 of the seat. This ring functions in the same manner as ring 20 in the embodiment of FIG. 1 in that it provides a rigid member against which rims 22 are compressed by flange faces 41. In this embodiment, the ring can be either separate from the seat and body or it can be placed in the mold and have the rubber-like material of the seat bonded to it, at the time the seat is molded, to form a somewhat integral part of the seat.

In the embodiment shown in FIG. 5, annular ring 45 is formed as an integral part of the seat by making it of moldable material like the rubber-like material of the seat but with sufficient rigidity and compressive strength to allow rims 22 to be compressed between it and faces 46 of slip-on flanges 47 and pipe ends 48.

In both of these alternate embodiments, the lower end of the valve stem is modified to insure a rigid support for the valve disc by providing an opening 49 in body 50 to receive end 51 of the stem. A bearing sleeve 52 is provided in the opening to reduce the torque necessary to rotate the valve disc and to more accurately align the stem in the body. An O-ring 53 is also provided as an additional seal between the stem and the seat.

As stated above, inner body 12a of the valve seat is made of rubber-like material, preferably either natural or synthetic rubber. It thus can be provided with the flexibility, resiliency and durability desired in a valve seat for this type valve by selecting a material having these qualities without concern for its ability to withstand certain fluids. The outer, relatively thin layer of plastic, of course, must be made from a plastic which will not be affected by the fluids to be handled. It should preferably be moldable, have some flexibility and have relatively good wear qualities. The material which is used frequently, as it has all of the claimed qualities in some measure, is fluorinated ethylenepropylene copolymer which is sold commercially under the trademark "Teflon" by the Du Pont de Nemours Company. Teflon is a material which can withstand most fluids encountered in everyday commercial processes although there are some which attack it, such as liquid sodium. It is moldable and has sufficient flexibility to allow it to be inserted in a valve body. It also is a good bearing material and thus tends to reduce the torque necessary to rotate the valve element.

The layer of Teflon is preferably thin relative to the body of rubber-like material. In the commercial embodiment of the invention, which is the embodiment shown in the drawings, the Teflon layer ranges between 0.020 to 0.060 inch thick, depending on the valve size.

Usually, the plastic layer is bonded to the rubber-like material. When the valve is to be used in a vacuum line, it is necesary that the two materials be bonded to maintain the plastic in place. Also, if they are bonded, the plastic is further held against any tendency it may have to cold flow under compression since its inner surface will be held against movement by the rubber-like material.

Preferably then, in manufacturing the valve seat of this invention, the Teflon is first molded to fit the inner contours of the valve seat to which it is to be attached. It is then treated with the proper chemicals to cause it to bond to the body of rubber-like material, placed in a mold and bonded to the inner surface of the body at the same time that the body is molded to its desired shape.

This results in a valve seat which is flexible so that it can be easily inserted in a valve body, resilient so that it can be deformed by the valve element without taking a permanent set, wear resistant and also capable of being used in valves handling fluids deleterious to the inner body of material supplying the desired resiliency.

From the foregoing, it will be seen that this invention is one well adapted to attain all of the ends and objects hereinabove set forth, together with other advantages which are obvious and which are inherent to the apparatus and structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. In a disc valve having a tubular body, a resilient seat of rubber-like material within the body, said seat having end seal faces, and a valve disc mounted in the body for rotation within the seat, the improvement which resides in the combination therewith of a thin layer of nonfrangible plastic, with cold flow characteristics, bonded to the inner surface of the seat, said plastic layer having the desired resistance to chemicals but being somewhat less pliable and resilient than the rubber-like material of the seat, said plastic layer extending between the end faces of the seat and covering at least the inner annular portions of the end seal faces, and said rubber-like material being of sufficient thickness and resiliency so as to remain under compression between the body and the valve disc in its closed position and thereby compensate for cold flow of the plastic layer due to radially outward deformation of said plastic layer by said closed disc.

2. In a disc valve including a one-piece tubular body having an inwardly extending annular ring located about midway from the ends of the body, a resilient seat of rubber-like material within the body, said seat having end seal faces and outwardly extending portions on each side of the ring, and a valve disc mounted in the body for rotation within the seat, the improvement which resides in the combination therewith of a thin layer of nonfrangible plastic, with cold flow characteristics, bonded to the inner surface of the seat, said plastic layer having the desired resistance to chemicals but being somewhat less pliable and resilient than the rubber-like material of the seat, said plastic layer extending between the end faces of the seat and covering at least the inner annular portions of the end seal faces, and said rubber-like material being of sufficient thickness and resiliency so as to remain under compression between the body and the valve disc in its closed position and thereby compensate for cold flow of the plastic layer due to radially outward deformation of said plastic layer by said closed disc.

3. A disc valve comprising a tubular body with abutment faces at each end for securing the body in a pipeline, an annular seal member of resilient, rubber-like material in the body, rims at the ends of the seal member extending, when uncompressed, slightly beyond the abutment faces on the body, said rims providing seal faces for mounting the valve in a pipeline; an annular ring of material, rigid as compared with the rubber-like material of the seal member, located between the rims of the seal member and extending inwardly of the body; a thin layer of nonfrangible plastic material, with cold flow characteristics, covering the inner surface of the seal member and at least a portion of the sealing faces of the rims, said plastic having good resistance to predetermined chemicals but being somewhat less pliable and resilient than the rubber-like material of the seat; the annular ring having a larger internal diameter than the internal diameter of the seal member to allow a substantial layer of the rubber-like material of the sealing member to reside between the plastic layer and the ring; and a valve disc mounted in the body and within the sealing member for engagement with the plastic material when the valve disc is in closed position, said layer of rubber-like material being of sufficient thickness and resiliency so as to remain under compression between the body and valve disc in its closed position and thereby compensate for cold flow of the plastic layer due to radially outward deformation of said plastic layer by said closed disc.

4. The disc valve of claim 3 in which the annular ring is made of moldable, rubber-like material having sufficient rigidity to compress the rims on the seal member between it and a pipeline in which the valve is mounted.

5. A disc valve comprising a one-piece tubular body having an annular undercut surface about its inner periphery at each end face of the body; an annular seat in the tubular body of rubber-like resilient material with a thin layer of nonfrangible plastic covering the inner surface of the seat and at least a portion of its ends, said plastic having cold flow characteristics and being somewhat less pliable and resilient than the rubber-like material of the seat; said seat having portions received in the spaces formed by the undercut surface; said seat portions, when the valve is not in a pipeline, extending axially beyond the end of the tubular body, said seat portions, when the valve is installed in a pipe, being forced into the spaces provided by the undercut surfaces; and a valve disc rotatably mounted in the body and cooperable with the layer of plastic to control flow through the valve, said rubber-like material being of sufficient thickness and resiliency so as to remain under compression between the body and valve disc in its closed position and thereby compensate for cold flow of the plastic layer due to radially outward deformation of said plastic layer by said closed disc.

6. A disc valve for installation between two flange fittings comprising a tubular body; flange fittings disposed at each end of the body; an annular seat member in the tubular body comprising a body of resilient, rubber-like material with a relatively thin layer of nonfrangible plastic covering its inner surface and a portion of its ends, the plastic having cold flow characteristics and being somewhat less pliable and resilient than the rubber-like material of the seat; said seat member being compressed by the flange fittings when the valve is installed to cause the body to hold the portions of the plastic covering the ends of the body in sealing engagement with the flange fittings to protect the body from the fluids flowing through the valve; a valve disc rotatably mounted within the seat member to coact with the seat member to control the flow of fluids through the valve, the outer diameter of the disc being larger than the inner diameter of the seat member to cause the disc to deform the body of resilient, rubber-like material and hold the layer of plastic in sealing engagement with the disc when the disc is in a fully closed position.

7. As a subcombination, a valve seat for a disc valve comprising an annular body means of rubber-like material having endwise facing seal surfaces on each end and a layer of nonfrangible plastic having cold flow characteristics bonded to and covering the inner surface of the annular body and an inner annular portion of each seal surface; said plastic being somewhat less pliable and resilient than the rubber-like material, and said rubber-like material being of sufficient thickness and resiliency so as to compensate for cold flow of the plastic layer due to radially outward deformation of said plastic layer as the outer circumference of said body means is confined against radial expansion.

8. The subcombination of claim 7 wherein the annular body of rubber-like resilient material is formed with a groove in its outer surface approximately midway of its ends.

9. The subcombination of claim 7 wherein the annular body has a ring of relatively rigid material embedded in its outer surface approximately midway of its ends, said ring having an inner diameter less than the inner diameter of the body.

References Cited by the Examiner

UNITED STATES PATENTS

| | | | |
|---|---|---|---|
| 1,251,453 | 12/1917 | Spencer | 251—306 |
| 1,579,140 | 3/1926 | Phillips | 137—444 X |
| 2,132,894 | 10/1938 | Esnard | 251—86 |
| 2,654,559 | 10/1953 | Franck | 251—331 |
| 2,725,211 | 11/1955 | Boteler | 251—368 X |
| 2,884,224 | 4/1959 | Frawkes | 251—306 |
| 2,918,089 | 12/1959 | McFarland | 251—331 X |
| 2,994,342 | 8/1961 | Stillwagon | 137—454.2 |
| 3,108,779 | 10/1963 | Anderson | 251—368 X |
| 3,118,465 | 1/1964 | Scaramucci | 137—454.2 |

FOREIGN PATENTS 240,907   10/1962   Australia.

ISADOR WEIL, *Primary Examiner.*